United States Patent [19]
Terasaki et al.

[11] Patent Number: 5,715,301
[45] Date of Patent: Feb. 3, 1998

[54] IN-HOUSE COMMUNICATION SYSTEM FOR TRANSMITTING AND RECEIVING BOTH VOICE AND DIGITAL DATA, AND COMMUNICATION TERMINALS USED IN THIS SYSTEM

[75] Inventors: Kimitoshi Terasaki, Miyaki-gun; Ryoichi Egasira, Munakata; Hiroshi Watanabe; Yuji Hirai, both of Fukuoka, all of Japan

[73] Assignee: Matsushita Electric Industrial Co., Ltd., Japan

[21] Appl. No.: 383,857

[22] Filed: Feb. 6, 1995

[30] Foreign Application Priority Data

Feb. 9, 1994 [JP] Japan .................................. 6-015178

[51] Int. Cl.⁶ .................................................. H04M 11/00
[52] U.S. Cl. .................. 379/100.16; 379/93.09; 379/373; 379/164; 358/434
[58] Field of Search .................. 379/100, 102, 379/104, 105, 94, 96, 93, 164, 165, 157, 156, 373, 201; 358/400, 401, 404, 434, 442, 443, 444

[56] References Cited

U.S. PATENT DOCUMENTS

| | | |
|---|---|---|
| 4,675,899 | 6/1987 | Ahuja .................................. 379/180 |
| 4,870,678 | 9/1989 | Adachi .................................. 379/100 |
| 4,935,955 | 6/1990 | Neudorfer ............................. 379/100 |
| 4,998,273 | 3/1991 | Nichols ................................. 379/102 |
| 5,073,922 | 12/1991 | Okada ................................... 379/164 |
| 5,185,784 | 2/1993 | Nashimoto ............................ 379/100 |
| 5,291,549 | 3/1994 | Izumi .................................... 379/233 |
| 5,361,296 | 11/1994 | Reyes et al. .......................... 379/102 |
| 5,425,081 | 6/1995 | Gordon et al. ....................... 379/100 |
| 5,446,784 | 8/1995 | MacTaggart .......................... 379/102 |
| 5,499,287 | 3/1996 | Campbell et al. .................... 379/100 |
| 5,544,235 | 8/1996 | Ardon ................................... 379/373 |
| 5,563,932 | 10/1996 | Tachibana et al. ................... 379/100 |
| 5,563,940 | 10/1996 | Tsuzuki et al. ...................... 379/233 |

FOREIGN PATENT DOCUMENTS 1315429  3/1993  Canada .

Primary Examiner—Stella Woo
Attorney, Agent, or Firm—Rossi & Associates

[57] ABSTRACT

An in-house communication system comprises a PBX and a line switching device 15 electively connected to a telephone 18 or a facsimile equipment 17 in response to a designating signal sent from an intended party designating signal sending device 6 or 42 of the PBX, thereby providing both facsimile and telephone service directly available in each guest room of a hotel without renovating the telephone wiring in the facility.

21 Claims, 10 Drawing Sheets

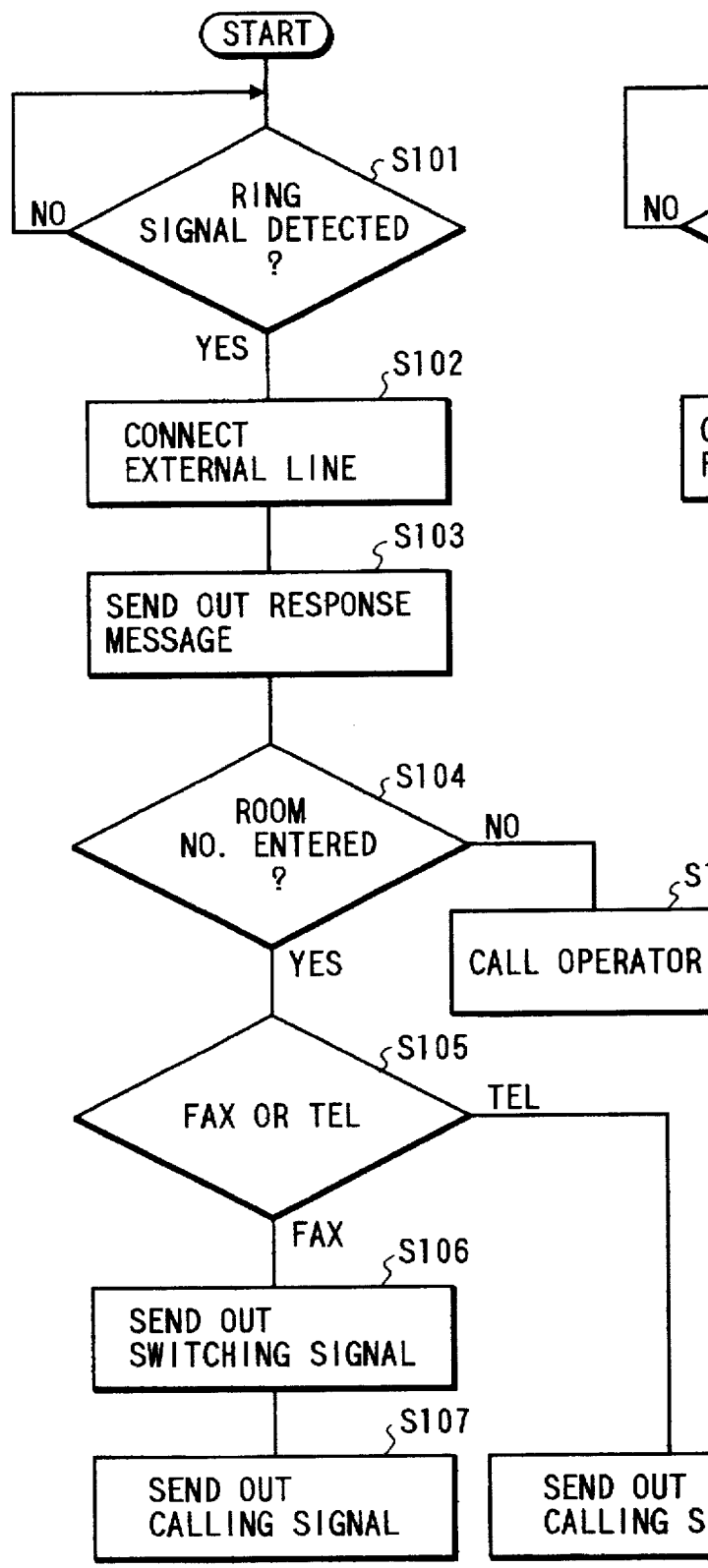
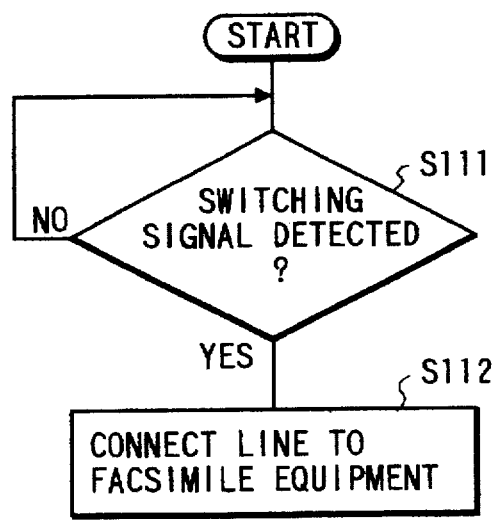
FIG. 8A
FIG. 8B

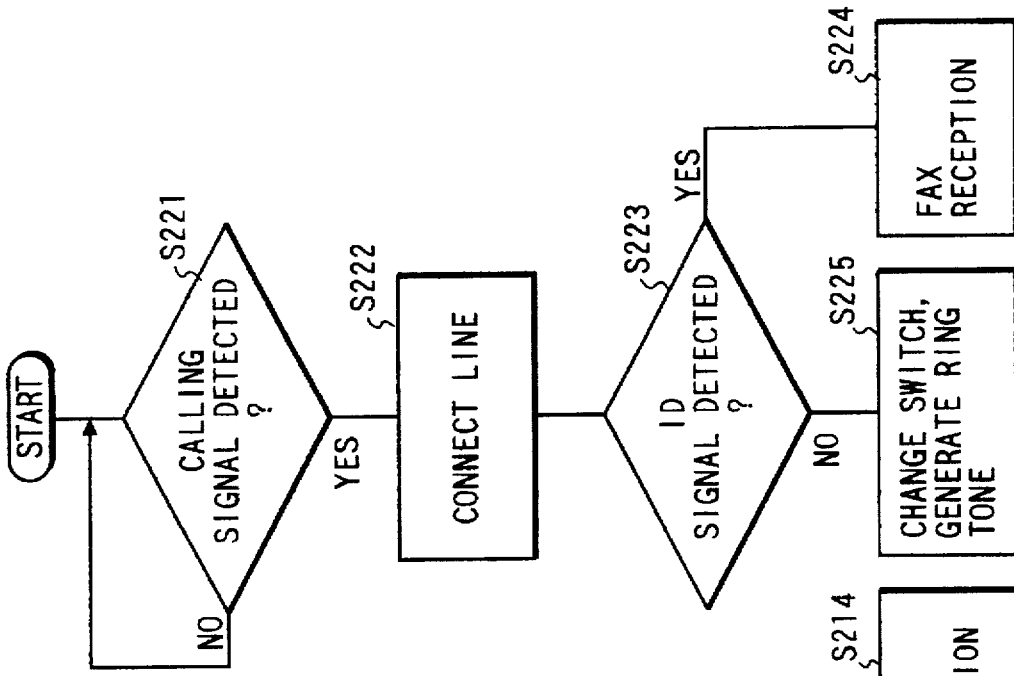
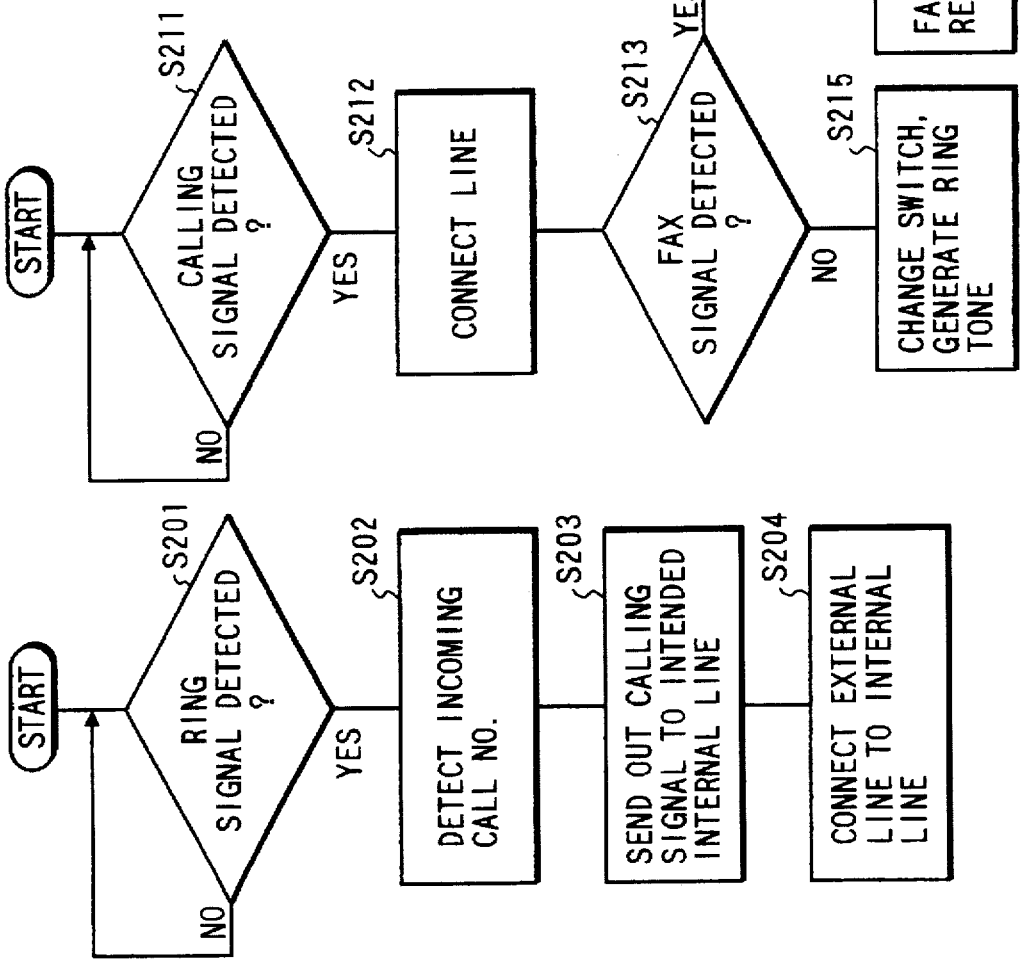
FIG. 10A, FIG. 10B, FIG. 10C

IN-HOUSE COMMUNICATION SYSTEM FOR TRANSMITTING AND RECEIVING BOTH VOICE AND DIGITAL DATA, AND COMMUNICATION TERMINALS USED IN THIS SYSTEM

BACKGROUND OF THE INVENTION

1. Field of the Invention:

The present invention generally relates to an in-house communication system used in a facility, such as a hotel, and communication terminals incorporated in this system.

2. Prior Art:

Many of hotels have recently introduced communication terminals other than telephones, such as facsimile equipments, in order to provide their guests with increased convenience in business etc.

However, the conventional facsimile service available was not so convenient. It is usual that a facsimile equipment is installed at a front desk or a central office of a hotel. Thus, every facsimile letter or document is once received by the hotel (i.e. at the front desk or the like) and then delivered by a hotel clerk to an individual guest room. Otherwise, each guest is asked to pick up his/her facsimile letter or document at the front desk. In short, the conventional facsimile service depends on the service rendered by the hotel clerk or an individual guest, which might cause troubles derived from its hand-to-hand operation-such as misdelivery of facsimile letter.

To solve such problems, it will be possible to install an independent facsimile equipment in each guest room. However, it requires another telephone wiring dedicated to the facsimile equipment, besides an already existing telephone line. It is needless to say that the installation of new telephone line is troublesome and not economical.

SUMMARY OF THE INVENTION

Accordingly, in view of above-described problems encountered in the prior art, a principal object of the present invention is to provide an in-house communication system and communication terminals capable of utilizing an already existing telephone line for both voice conversation and data communication (e.g. facsimile communication) respectively executed by a telephone and another communication terminal installed together in each room of a facility such as a hotel.

In order to accomplish this and other related objects, a first aspect of the present invention provides an in-house communication system comprising: external line interface means acting as an interface engageable with an external telephone line; internal line interface means acting as an interface to an internal telephone line; incoming call number detecting means for detecting an incoming call number entered from an external telephone line through the external line interface means and for outputting an incoming call number data representing the incoming call number detected; communication channel switching means for establishing a communication line connecting the external telephone line to a desired one of a plurality of internal telephone lines; calling signal sending means for producing calling signals of plural patterns; memory means for storing a table memorizing information relating to internal telephone lines corresponding to each of the incoming call number data; first control means for determining an intended internal line based on the table in the memory means upon receiving the incoming call number data from the incoming call number detecting means, for judging whether the incoming call number data is designated for a first terminal or a second terminal, and for controlling the calling signal sending means to send out a first calling signal to the intended internal telephone line when the incoming call number data is designated for the first terminal while controlling the calling signal sending means to send out a second calling signal to the intended internal telephone line when the incoming call number data is designated for the second terminal; and bell signal detecting means for detecting the calling signal sent out from the calling signal sending means; internal line switching means; and second control means for judging a calling signal pattern based on an information detected by the bell signal detecting means, and for controlling the internal line switching means to connect the intended internal telephone line to the first terminal when the first calling signal is generated from the calling signal sending means while controlling the internal line switching means to connect the intended internal telephone line to the second terminal when the second calling signal is generated from the calling signal sending means.

A second aspect of the present invention provides an in-house communication system comprising: external line interface means acting as an interface to an external telephone line; internal line interface means acting as an interface to an internal telephone line; intended party designating signal detecting means for detecting an intended party designating signal entered from the external telephone line through the external line interface means; calling signal sending means; internal line switching signal sending means for sending out a switching signal in response to the intended party designating signal; control means for controlling, on the basis on information involved in the intended party designating signal detected by the intended party designating signal detecting means, the internal line switching signal sending means to send out the switching signal to the internal telephone line through the internal line interface means while controlling the calling signal sending means to send out a calling signal to the internal telephone line through the internal line interface means; and internal line switching means for selectively connecting the internal telephone line to a first terminal or a second terminal in accordance with the switching signal sent from the internal line switching signal sending means.

A third aspect of the present invention provides a facsimile equipment comprising: line interface means acting as an interface engageable with a telephone line; facsimile communication means; dialing means for entering a telephone number of an opponent party; memory means for memorizing information relating to communication result; first control means for controlling the dialing means to execute a dialing operation when a facsimile transmission mode is selected, for controlling the facsimile communication means to start transmitting image data after receiving a response from the opponent party, and for memorizing result of image data transmission in the memory means; and second control means for disconnecting the telephone line after the first control means completes the image data transmission and then connecting the telephone line again to send out the result of image data transmission stored in the memory means to a private branch exchange.

The private branch exchange collects billing report relating to the communication result of image data transmission.

Furthermore, a fourth aspect of the present invention provides a communication terminal comprising: line interface means acting as an interface engageable with a telephone line; means for detecting a facsimile signal or an identification code entered through the line interface means; voice communication means for executing voice communication; facsimile communication means for executing communication of facsimile signals; calling signal detecting means for detecting a calling signal; ring tone generating means for generating ring tone; switch means for selectively connecting the telephone line to the voice communication means or the facsimile communication means; and control means for controlling the line interface means to engage with the telephone line in response to the calling signal detected by the calling signal detecting means; and for controlling the facsimile communication means to execute a facsimile receiving operation when the facsimile signal or identification code is detected, while controlling the switch means to change a communication line to the voice communication means and controlling the ring tone generating means to generate the ring tone when the facsimile signal or identification code is not detected.

BRIEF DESCRIPTION OF THE DRAWINGS

The above and other objects, features and advantages of the present invention will become more apparent from the following detailed description which is to be read in conjunction with the accompanying drawings, in which:

FIGS. 8A and 8B are flowcharts showing operation of the in-house communication system in accordance with the second embodiment of the present invention;

FIGS. 10A, 10B and 10C are flowcharts showing operation of the in-house communication system in accordance with the third embodiment of the present invention.

DETAILED DESCRIPTION ON THE PREFERRED EMBODIMENTS

Figure 1:
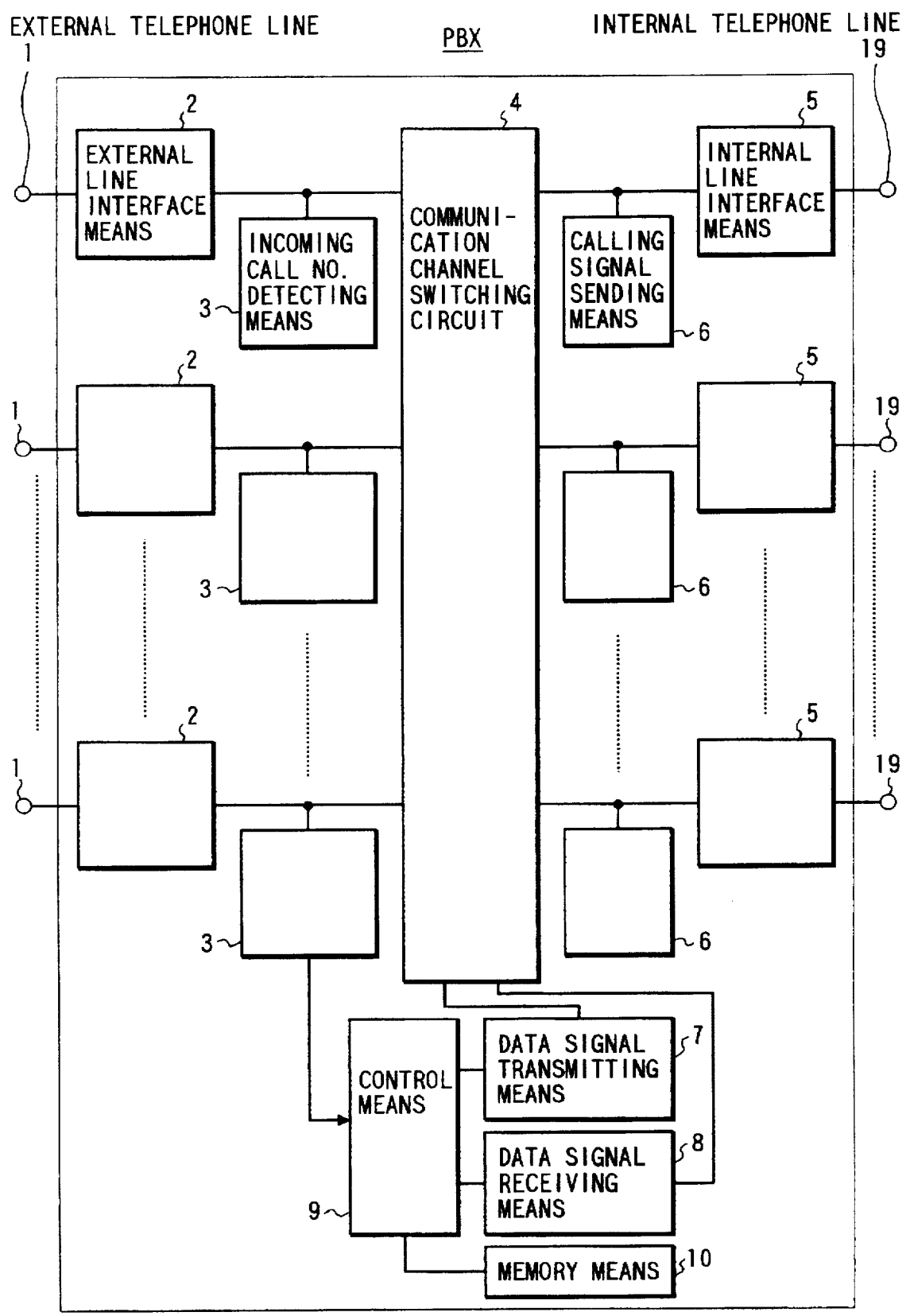
FIG. 1 is a schematic block diagram showing a private branch exchange in an in-house communication system in accordance with a first embodiment of the present invention.

Preferred embodiments of the present invention will be explained in greater detail hereinafter, with reference to the accompanying drawings wherein the same reference numerals are applied to like parts.

First Embodiment

Figure 2:
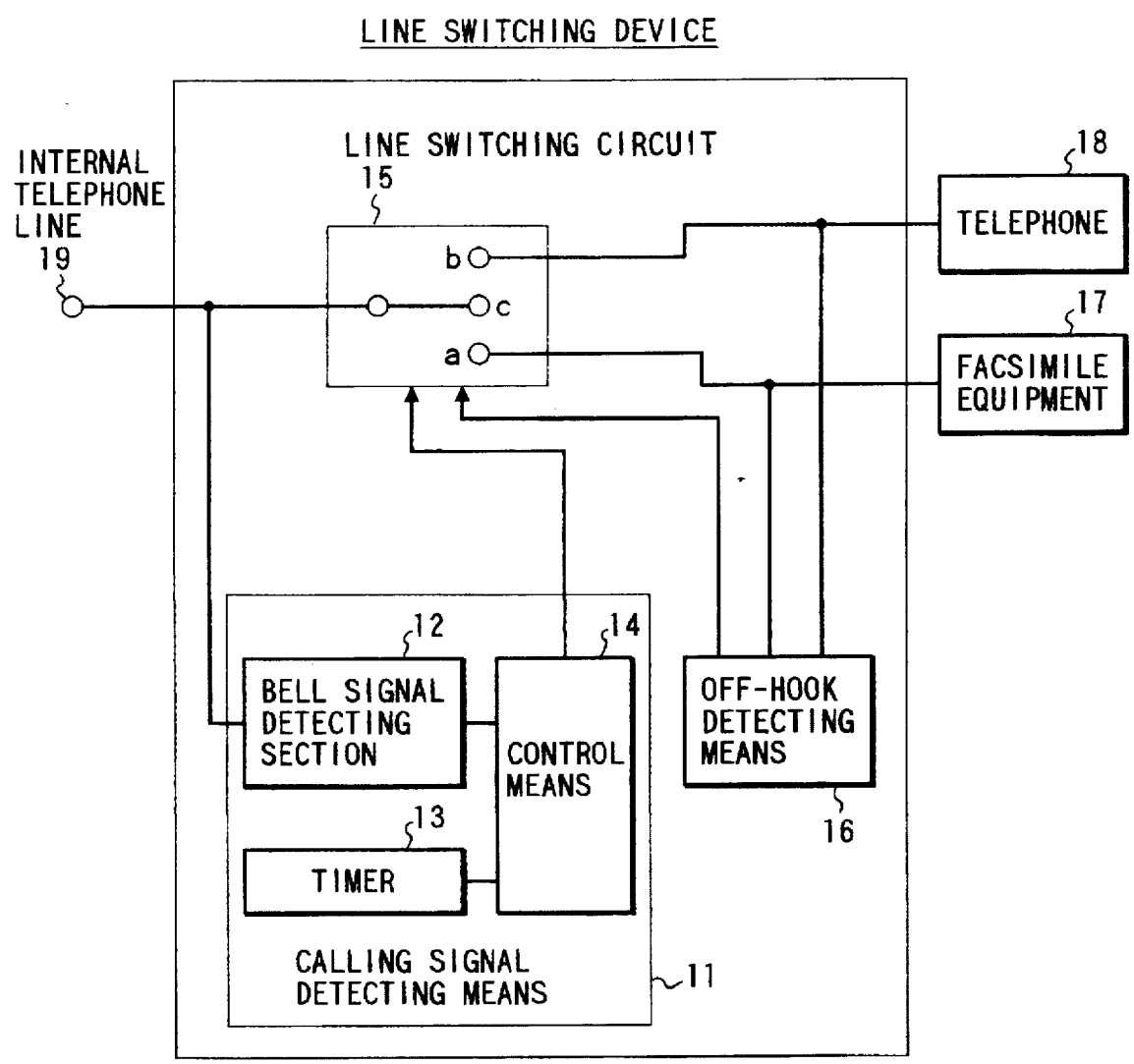
FIG. 2 is a schematic block diagram showing a line switching device in the in-house communication system in accordance with the first embodiment of the present invention.
Figure 3:
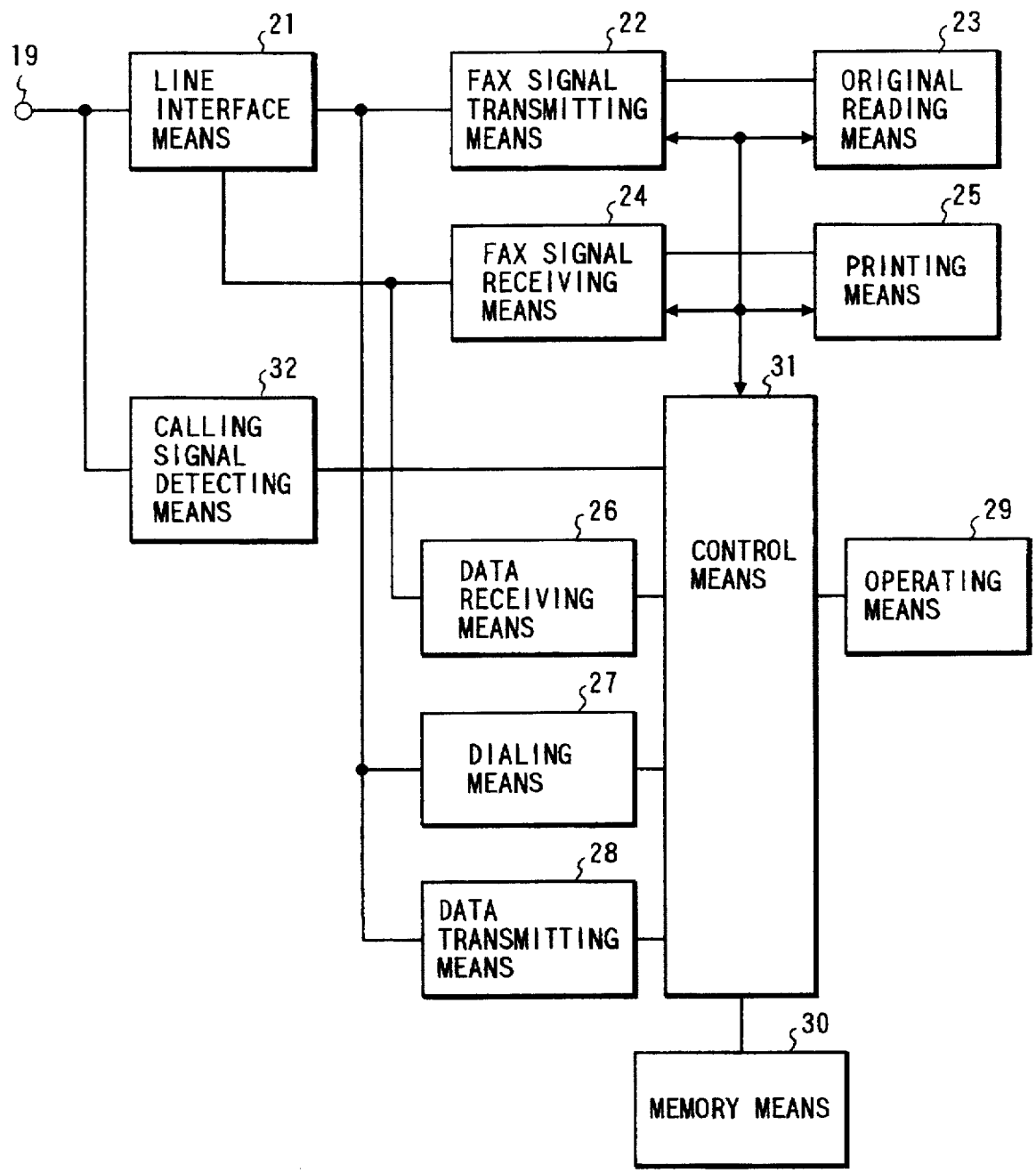
FIG. 3 is a schematic block diagram showing a facsimile equipment in the in-house communication system in accordance with the first embodiment of the present invention.

FIGS. 1, 2 and 3 are block diagrams cooperatively showing an in-house communication system in accordance with a first embodiment of the present invention. FIG. 1 shows a private branch exchange (abbreviated PBX) installed, for example, in a central office of a facility such as a hotel. FIG. 2 shows a line switching device installed in individual rooms each guest room), while FIG. 3 shows a facsimile equipment in each room, connected to said line switching device. The line switching device shown in FIG. 2 is connected to an internal telephone line in the PBX of FIG. 1. FIGS. 4 and 5 show the operation of the in-house communication system in accordance with the first embodiment of the present invention.

In FIG. 1, a reference numeral 1 represents an external telephone line connecting an external exchange station and the PBX of the facility. A reference numeral 2 represents an external line interface means acting as an interface to the external telephone line 1. More specifically, the external line interface means 2 is engageable with the external telephone line 1 for voice and data communication. A reference numeral 3 represents an incoming call number detecting means for detecting an incoming call number entered from the external telephone line 1 through the external line interface means 2 and for outputting an incoming call number data representing the incoming call number detected. In other words, the means 3 functions as an intended party designating signal detecting means for detecting an intended party designating signal entered from the external telephone line 1 through the external line interface means 2.

A reference numeral 4 represents a communication channel switching means which establishes a communication line connecting any one of the external telephone lines 1—1 to a desired one of a plurality of internal telephone lines 19—19. A reference numeral 5 represents an internal line interface means acting as an interface to each internal telephone line 19. A reference numeral 6 represents a calling signal sending means which produces calling signals of plural patterns in accordance with the incoming call number data (i.e. the intended party designating signal). A reference numeral 7 represents a data signal transmitting means for sending out a request data to an associated communication terminal such as a facsimile equipment 17. A reference numeral 8 represents a data signal receiving means for receiving data from the associated communication terminal. A reference numeral 9 represents a control means which performs various functions for executing the voice/data communications in accordance with the present invention. A reference numeral 10 represents a memory means which stores a table memorizing information relating to internal telephone lines 19—19 corresponding to each of the incoming call number data (i.e. intended party designating signal).

In FIG. 2, a reference numeral 11 represents a calling signal detecting means, which consists of a bell signal detecting section 12, a timer 13 and a control means 14. The bell signal detecting section 12 detects the calling signal sent from the calling signal sending means 6 in the PBX of FIG. 1. A reference numeral 15 represents an internal line switching means which selectively connects each internal telephone line 19 to a first terminal or a second terminal in accordance with a pattern of the calling signal sent out from the calling signal sending means 6. A reference numeral 16 represents an off-hook detecting means. A reference numeral 17 represents a facsimile equipment serving as the first terminal, while a reference numeral 18 represents a telephone serving as the second terminal.

In FIG. 3, a reference numeral 21 represents a line interface means acting as an interface engageable with a related internal telephone line 19. A reference numeral 22 represents a facsimile signal transmitting means. A reference numeral 23 represents an original reading means for reading image of an original. The image data read by the original reading means 23 is sent by the facsimile signal transmitting means 22 transmits to the line interface means 21. A reference numeral 24 represents a facsimile signal receiving means 24 for receiving image data sent from an external party through the line interface means 21. A reference numeral 25 represents a printing means 25 for print out the image data received by the facsimile signal receiving means 24.

A reference numeral 26 represents a data receiving means for receiving data transmitted from the PBX. A reference numeral 27 represents a dialing means. A reference numeral 28 represents a data transmitting means for transmitting data to the PBX. A reference numeral 29 represents an operating means for allowing an operator to enter data or various commands a reference numeral 30 represents a memory for memorizing information relating to communication result. More specifically, the memory 30 memorizes information relating to communication result of each guest room of a hotel in which the facsimile equipment 17 is installed. The information relating to communication result of each guest room can-be sent to the PBX in response to a request signal sent from the PBX. A reference numeral 31 represents a control means for performing various functions of the facsimile equipment 17. A reference numeral 32 represents a calling signal detecting means for detecting the calling signal entered through the internal telephone line 19.

Operation of the in-house communication system having an arrangement described above will be explained hereinafter. First of all, dial-in service will be described. The dial-in service generally allows us to allocate a plurality of telephone numbers to a single telephone line connecting an external exchange station and a subscriber. If any one of the designated telephone numbers is dialed by an external party, a private branch exchange (PBX) receives a call placed and detects an intended party (i.e. incoming call number) based on a data transmitted from the external exchange station. Thus, the PBX connects the external telephone line to an internal telephone line belonging to the intended party, thereby sending a calling signal. Furthermore, the dial-in service allows us to allocate many telephone numbers larger than the number of existing telephone lines. Thus, when any one of these telephone numbers is dialed, this call can be flexibly received by any one of non-engaged telephone lines.

The embodiment of the present invention is based on such a dial-in service system. Namely, many telephone numbers are allocated to a plurality of telephone lines (i.e. external telephone lines) 1—1 connecting the external exchange station and the PBX installed in the hotel. Each guest room of the hotel is equipped with the telephone 18 and the facsimile equipment 17 which are connected to the PBX through the internal telephone lines 19—19. The telephone 18 and the facsimile equipment 17 installed in the same guest room are respectively given an exclusive telephone number. In other words, each of the telephones 18–18 and the facsimile equipments 17—17 can be identified by its telephone number.

Thus, an external party can reach a guest staying in the hotel if the telephone and/or facsimile numbers of the room of this guest are known beforehand.

Next, operation of facsimile transmission executed by the external party to reach the guest in the hotel will be explained with reference to FIGS. 4A and 4B. First of all, the external party dials the facsimile number of the room of this guest. The external exchange station, having received this facsimile number, sends a ring signal together with the facsimile number to a corresponding subscriber (i.e. hotel). These signals are received by the PBX in the hotel.

Figure 4A:
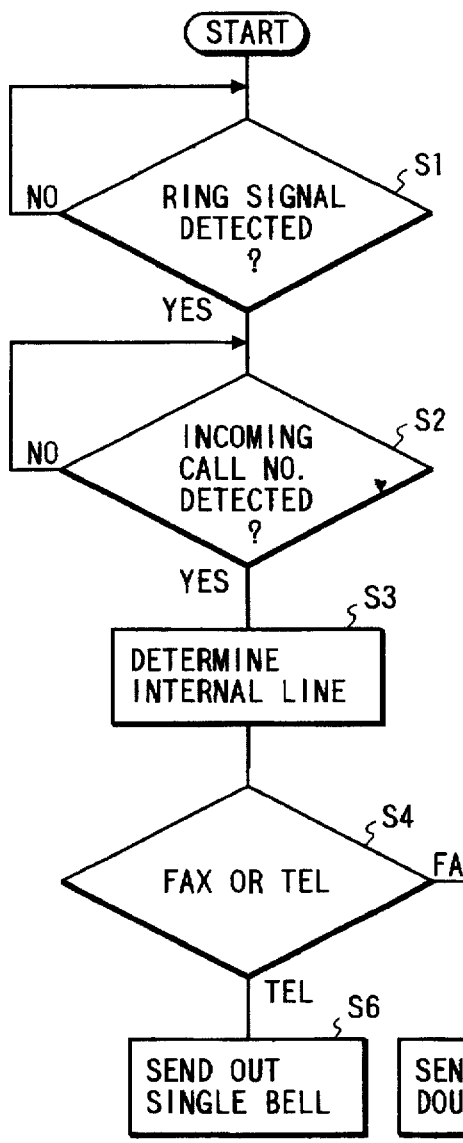
FIGS. 4A and 4B are flowcharts showing operation of the in-house communication system in accordance with the first embodiment of the present invention.

Referring to FIG. 4A, a judgement is made in a step S1 as to whether or not the ring signal is detected by the external line interface means 2 in the PBX. Then, a judgement is further made in a step S2 as to whether or not the incoming call number (i.e. the facsimile number in this case) is detected in the incoming call number detecting means 3. When the incoming call number is detected, the incoming call number data representing the incoming call number is sent to the control means 9.

The table stored in the memory means 10 memorizes internal telephone line ports corresponding to incoming call number data, and information indicating which the incoming call number data is related to the telephone 18 or the facsimile equipment 17. Thus, in a step S3, the control means 9 determines an intended internal telephone line 19 to be connected to the external telephone line i referring to the table in the memory 10. Next., it is judged in a step S4 as to whether the incoming call number data is related to the telephone 18 or the facsimile equipment 17. When the incoming call number data relates to the facsimile equipment 17, a calling signal of double bell is sent out. More specifically, the calling signal sending means 6 generates the double bell signal and sends out it through the internal line interface means 5 to the internal telephone line 19. (Step S5) On the other hand, when the incoming call number data relates to the telephone 18, a calling signal of single bell is sent out. More specifically, the calling signal sending means 6 generates the single bell signal and sends out it through the internal line interface means 5 to the internal telephone line 19. (Step S6)

A ringing pattern of the single bell is repetition of a cycle consisting of a ring period of approximately 1–2 seconds and a dormant period of 2–1 seconds. On the other hand, a ringing pattern of the double bell is repetition of a cycle consisting of a first ring period of approximately 0.2–1 second, a second dormant period of 0.7 second or less, a second ring period of approximately 0.2–1 second, a second dormant period of approximately 2–4 seconds.

Figure 4B:
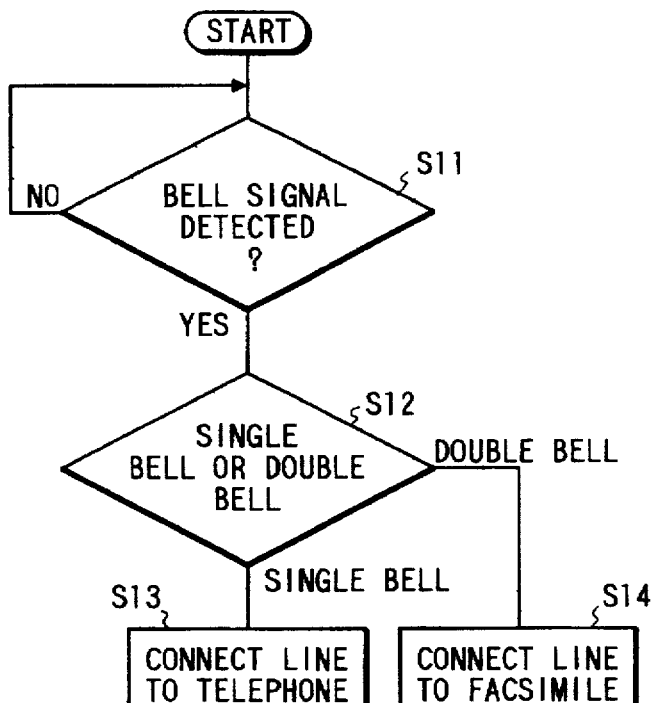

Referring to the flowchart of FIG. 4B, a calling signal detecting operation is explained. First of all, a judgement is made in a step S11 as to whether or not the calling signal (i.e. the bell signal) sent out from the PBX is detected by the bell signal detecting section 12 in the calling signal detecting means 11 of the line switching device. The information detected is sent to the control means 14 to identify its ringing pattern. Namely, when the bell signal detecting section 12 detects termination of the ring period, the control means 14 activates the timer 13 to measure the length of the succeeding dormant period. If the length of the succeeding dormant period is equal to or less than 0.7 second, it is judged that the calling signal is a double bell. If the length of the succeeding dormant period is larger than 0.7 second, it is judged that the calling signal is a single bell. (Step S12) When the calling signal is the single bell, the internal line switching means 15 is controlled to connect the telephone line 19 to the telephone 18. (Step S13) When the calling signal is the double bell, the internal line switching means 15 is controlled to connect the telephone line 19 to the facsimile equipment 17. (Step S14) As the incoming call relates to facsimile transmission in this case, the telephone line 19 is connected to the facsimile equipment 17 in response to the double bell sent from the PBX.

Once the telephone line 19 is connected with the facsimile equipment 17, the calling signal detecting means 32 detects the calling signal sent from the PBX and transmits an information detected to the control means 31. The control means 31 controls the line interface means 21 to engage with the internal telephone line 19, thereby allowing the facsimile signal receiving means 24 to receive image signal from the external party and then making the printing means 25 print the image received.

Next, operation of facsimile transmission executed by the guest in the hotel to reach the external party will be explained. First of all, the guest manipulates the operating means 29 of the facsimile equipment 17 to input a command of establishing a communication line. The control means 31 controls the line interface means 21 to engage with the telephone lie 19. The off-hook detecting means 16 of the line switching section has a function of detecting an off-hook condition of the facsimile equipment 17, i.e. establishment of the communication line, and switching the line switching means 15 to the facsimile equipment 17. Establishment of the communication line can be detected by applying a certain amount of voltage to each telephone line 19 of each facsimile equipment 17 and each telephone 18 and sensing a current flowing through the telephone line 19 in response to such an establishment.

Subsequently, the guest enters a facsimile number of an opponent party by means of the operating means 29, then pushes a transmission button, allowing the original reading means 23 to read the image of an original being set. Thus, the image read in this manner is sent to the opponent party by the facsimile signal transmitting means 22. When the facsimile transmission is terminated, the control means 31 in the facsimile equipment 17 disengages the line interface means 21 from the telephone line 19.

Figure 5A:
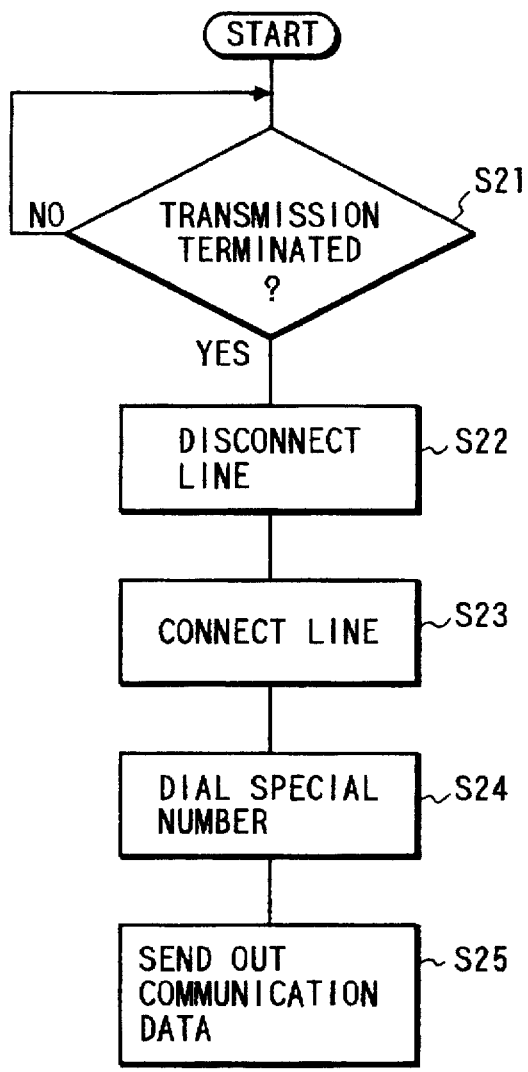
FIGS. 5A and 5B are flowcharts showing operation of the in-house communication, system in accordance with the first embodiment of the present invention.

Referring now to the flowchart of FIG. 5A, a method of collecting billing reports reflecting the result of communication will be explained. In a step S21, it is judged whether or not the transmission is terminated. If the judgement is YES in the step S21, the control means 31 disengages the line interface means 21 from the telephone line 19. (Step S22) Then, the off-hook detecting means 16 switches the line switching means 15 to an OFF position (i.e. c-position).

In turn, after a predetermined time has elapsed, the control means 31 again engages the line interface means 21 with the telephone line 19. (Step S23) Then, the dialing means 27 sends out a special dialing signal, such as dial "0", to the PBX. (Step S24) When received the special dialing signal, the control means 9 in the PBX controls the communication channel switching circuit 4 to connect the data signal transmitting means 7 and data signal receiving means 8, thereby sending out a signal requesting a communication report from the data signal transmitting means 7. The data receiving means 26 of the facsimile equipment 17, upon receiving this request signal, generates an output sent to the control means 31. The control means 31 controls the data transmitting means 28 to transmit the PBX a signal involving billing report data relating to the result of communication, which is memorized in the memory 30. (Step S25) The PBX receives the billing report data and sends it to a computer (not shown) to calculate the facsimile communication charge to be imposed on each guest.

Figure 5B:
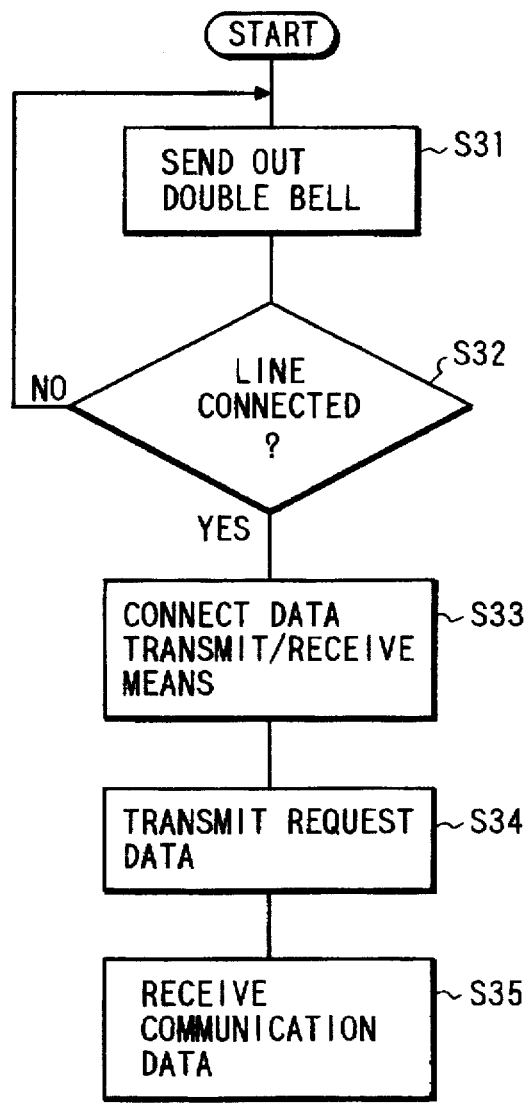

FIG. 5B shows another method of collecting billing reports reflecting the result of communication. According to this method, the PBX makes the calling signal sending means 6 send out a double bell to each internal telephone line 19 at a predetermined interval or in response to an operator's instruction. (Step S31) The line switching device, when detected the double bell, connects the line to the facsimile equipment 17. If a communication line connecting the facsimile equipment 17 to the internal telephone line 19 is established (Step S32), the data signal transmitting means 7 and the data signal receiving means 8 are connected to the internal telephone line 19 via the communication channel switching circuit 4. (Step S33) Thereafter, a data requesting a communication report data is sent out. (Step S34) The data receiving means 26 of the facsimile equipment 17, upon receiving this request data, generates an output sent to the control means 31. The control means 31 controls the data transmitting means 28 to transmit the PBX a signal involving billing report data relating to the result of communication, which is memorized in the memory 30. The PBX receives the billing report data and sends it to a computer (not shown) to calculate the facsimile communication charge to be imposed on each guest. (Step S35)

As described above, the first embodiment of the present invention can provide both facsimile and telephone service directly available in each guest room without renovating the telephone wiring in the facility or depending on an operator. Since the PBX collects the billing report data and the computer calculates the facsimile communication charge to be imposed on each guest, payment of communication charge at check out is automatic and simple.

In summary, the first embodiment of the present invention provides an in-house communication system comprising: external line interface means (2) acting as an interface to an external telephone line (1); internal line interface means (5) acting as an interface to an internal telephone line (19); intended party designating signal detecting means (3) for detecting an intended party designating signal entered from the external telephone line (1) through the external line interface means (2); calling signal sending means (6) for producing calling signals of plural patterns (e.g. single bell and double bell) in accordance with the intended party designating signal; control means (9) for controlling the calling signal sending means (6) to send out a calling signal to the internal telephone line (19) through the internal line interface means (5) on the basis on information involved in the intended party designating signal detected by the intended party designating signal detecting means (3); and internal line switching means (15) for selectively connecting the internal telephone line (19) to a first terminal (17) or a second terminal (18) in accordance with a pattern of the calling signal sent out from the calling signal sending means (6).

Furthermore, the first embodiment of the present invention provides an in-house communication system comprising: external line interface means (2) acting as an interface engageable with an external telephone line (1); internal line interface means (5) acting as an interface to an internal telephone line (19); incoming call number detecting means (3) for detecting an incoming call number entered from an external telephone line (1) through the external line interface means (2) and for outputting an incoming call number data representing the incoming call number detected; communication channel switching means (4) for establishing a communication line connecting the external telephone line (1) to a desired one of a plurality of internal telephone lines (19—19); calling signal sending means (6) for producing calling signals of plural patterns (e.g. single bell and double bell); memory means (10) for storing a table memorizing information relating to internal telephone lines (19—19) corresponding to each of the incoming call number data; first control means (9) for determining an intended internal line (19) based on the table in the memory means (10) upon receiving the incoming Call number data from the incoming call number detecting means (3), for judging whether the incoming call number data is designated for a first terminal (17) or a second terminal (18), and for controlling the calling signal sending means (6) to send out a first calling signal (i.e. double bell) to the intended internal telephone line (19) when the incoming call number data is designated for the first terminal (17) while controlling the calling signal sending means (6) to send out a second calling signal (i.e. single bell) to the intended internal telephone line (19) when the incoming call number data is designated for the second terminal (18); and bell signal detecting means (12) for detecting the calling signal sent out from the calling signal sending means (6); internal line switching means (15); and second control means (14) for judging a calling signal pattern based on an information detected by the bell signal detecting means (12), and for controlling the internal line switching means (15) to connect the intended internal telephone line (19) to the first terminal (17) when the first calling signal is generated from the calling signal sending means (6) while controlling the internal line switching means (15) to connect the intended internal telephone line (19) to the second terminal (17) when the second calling signal is generated from the calling signal sending means (6).

Still further, the first embodiment of the present invention provides an in-house communication system comprising a private branch exchange (PBX) and at least one facsimile equipment (17), wherein the facsimile equipment (17) includes: line interface means (21) acting as an interface engageable with a telephone line (19); facsimile communication means 23, 24 and 25); dialing means (27) for entering a telephone number of an opponent party; first memory means (30) for memorizing information relating to communication result; first control means (31) for controlling the dialing means (27) to execute a dialing operation when a facsimile transmission mode is selected, for controlling the facsimile communication means (22, 23, 24 and 25) to start transmitting image data after receiving a response from the opponent party, and for memorizing result of image data transmission in the first memory means (30); and second control means (31) for disconnecting the telephone line (Step S22) after the first control means (31) completes the image data transmission (Step S21) and then connecting the telephone line again (Step S23) to send out the result of image data transmission stored in the first memory means (30) to the private branch exchange (PBX) (Step S25); and the private branch exchange (PBX) includes a second memory means (10) for memorizing the result of image data transmission.

It is preferable that the first memory means (30) in the facsimile equipment memorizes information relating to communication result of each guest room in which the facsimile equipment (17) is installed, and sends the information relating to communication result of each guest room to the private branch exchange (PBX) in response to a request signal sent from the private branch exchange (PBX).

Moreover, the first embodiment of the present invention provides an in-house communication system comprising a facsimile equipment (17) and a private branch exchange (PBX) connected with each other, wherein the facsimile equipment (17) includes: line interface means (21) acting as an interface engageable with a telephone line; reading means (23) for reading an original; transmitting means (22) for transmitting image data obtained from the reading means (23); dialing means (27) for entering a telephone number of an opponent party; calling signal detecting means (32) for detecting a calling signal; data detecting means (26); first memory means (30) for memorizing information relating to communication result; first control means (31) for controlling the dialing means (27) to execute a dialing operation when a facsimile transmission mode is selected, for controlling the transmitting means (22) to start transmitting image data after receiving a response from the opponent party, and for memorizing result of image data transmission in the first memory means (30); and second control means (31) for engaging the line interface means (21) with the telephone line in response to a calling signal sent out from the private branch exchange (PBX) and detected by the calling signal detecting means (32), for sending out the result of image data transmission stored in the first memory means (30) to the private branch exchange (PBX) in response to a request data (Step S34) sent from the private branch exchange (PBX) and detected by the data detecting means (26); and the private branch exchange (PBX) includes: second memory means (10) for memorizing the result of image data transmission (Step S35); data transmitting means (7) for sending out the request data to the facsimile equipment (17); and calling signal sending means (6) for sending out the calling signal to be sent to the facsimile equipment (17).

Second Embodiment

Figure 6:
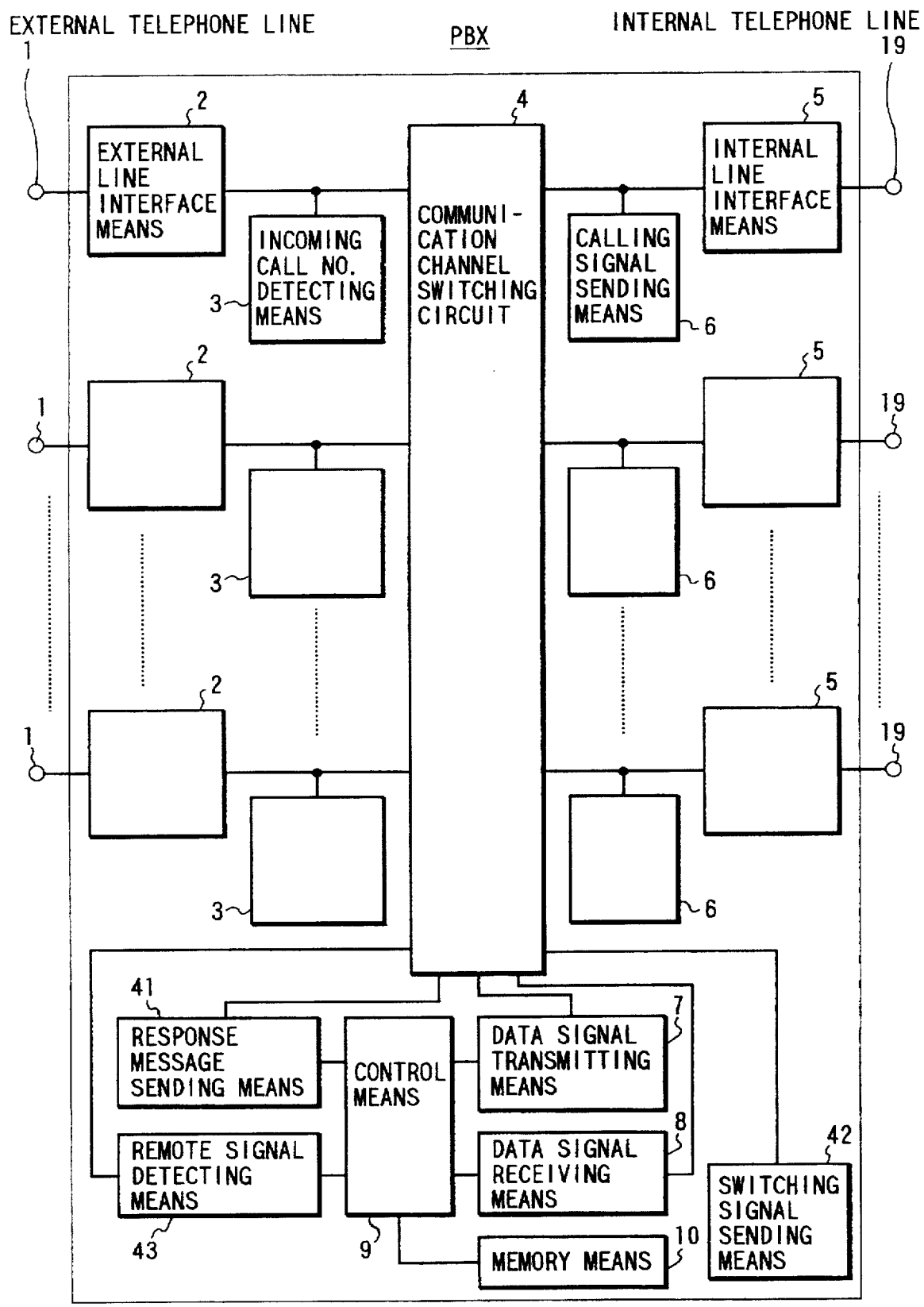
FIG. 6 is a schematic block diagram showing a private branch exchange in an in-house communication system in accordance with a second embodiment of the present invention.
Figure 7:
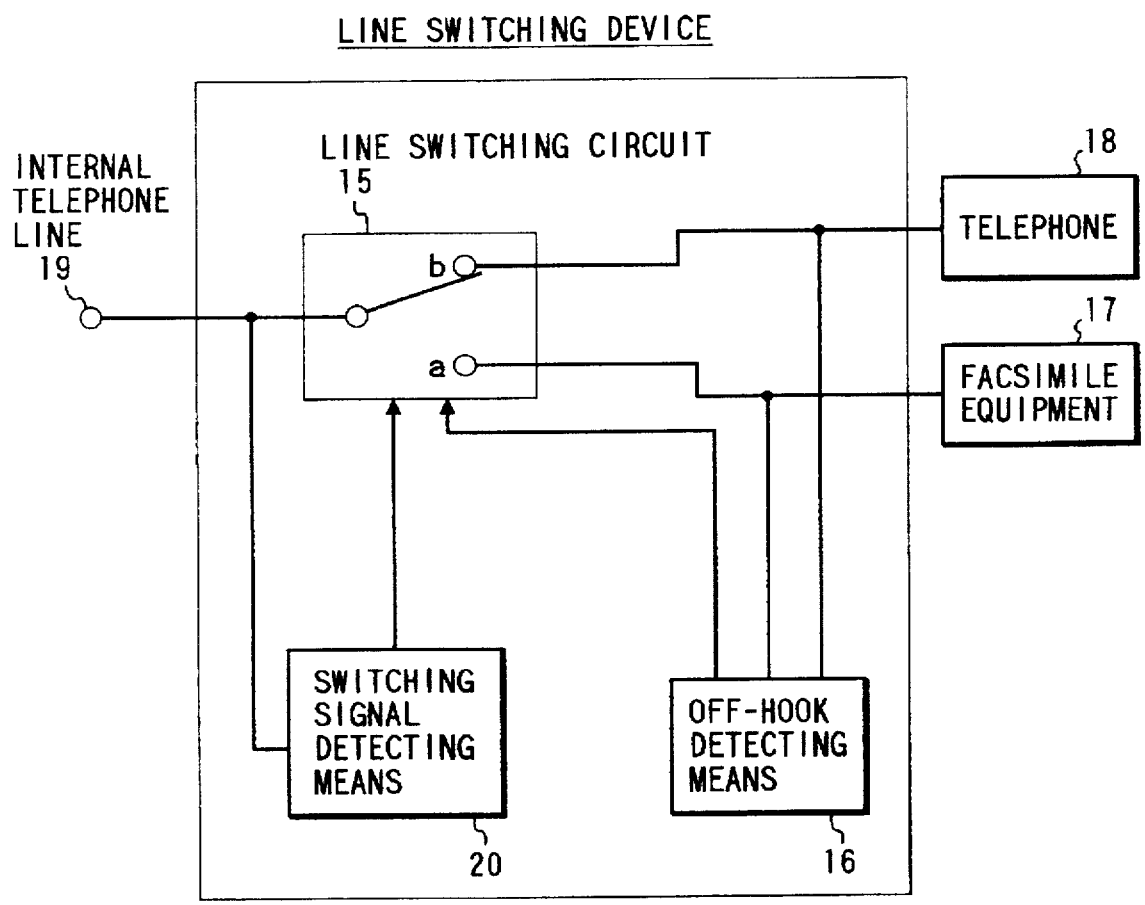
FIG. 7 is a schematic block diagram showing a line switching device in the in-house communication system in accordance with the second embodiment of the present invention.

FIGS. 6 and 7 are block diagrams cooperatively showing an in-house communication system in accordance with a second embodiment of the present invention. FIG. 6 shows a private branch exchange (abbreviated PBX) installed, for example, in a central office of a facility such as a hotel. FIG. 7 shows a line switching device installed in individual rooms (e.g. each guest room). This line switching device is connected to a facsimile equipment in each room, having the same arrangement as that of the first embodiment shown in FIG. 3.

FIGS. 8A and 8B show the operation of the in-house communication system in accordance with the second embodiment of the present invention.

In FIG. 6, a reference numeral 41 represents a response message sending means. A reference numeral 42 represents a switching signal sending means. A reference numeral 43 represents a remote signal detecting means. In FIG. 7, a reference numeral 20 represents a switching signal detecting means. The same reference numerals as those of the first embodiment are applied to like parts.

Operation of facsimile transmission executed by the external party to reach the guest in the hotel will be explained with reference to FIGS. 8A and 8B. First of all, the external party dials the facsimile number of the room of this guest. The external exchange station, having received this facsimile number, sends a ring signal to the PBX in a hotel.

Referring to FIG. 8A, a judgement is made in a step S101 as to whether or not the ring signal is detected by the external line interface means 2 in the PBX. When the ring signal is detected, the control means 9 controls the external line interface means 2 to engage with the external telephone line 1. (Step S102) In turn, the control means 9 controls the communication channel switching circuit 4 to establish a communication line connecting the response message sending means 41 to the external telephone line i carrying the ring signal. The construction of message to be sent out is such that (1) telling the name of hotel, (2) asking an opponent party to enter a guest room number if he/she wishes direct communicate with the guest, and (3) otherwise asking the opponent party to dial "0" to call an operator. (Step S103)

The opponent party enters the room number of the intended guest in response to the above message. The signal representing the room number is sent through the external exchange station to the remote signal detecting means 43 in the PBX. The remote signal detecting means 43 generates a detection signal to the control means 9. (Step 8104). The control means 9 controls the memory means 10 to temporarily memorize the room number of the intended guest.

Next, the response message sending means 10 generates the next message asking the opponent party to enter "1" if he/she wishes telephone conversation or to enter "2" if he/she wishes facsimile communication. Thus, the opponent party will dial "2" when he/she wishes facsimile communication. The signal representing the dial "2" is received by the remote signal detecting means 43 and a detection signal is sent to the control means 9. (Step S105)

The control means 9 controls the switching signal sending means 42 to send out a switching signal to an internal telephone line 19 corresponding to the room number designated by the opponent party which has been received and stored in the memory means 10. (Step S106) Meanwhile, the control means 9 controls the calling signal sending means 6 to send out a calling signal representing facsimile communication. (Step S107) The switching signal can have any pattern—for example, 1 kHz signal being sent out for 1 second period, or DTMF signal.

When the switching signal detecting means 20 in the line switching device shown in FIG. 7 receives the switching signal sent from the PBX (S111), the switching signal detecting means 20 controls the line switching means 15 to connect the internal telephone line 19 to the facsimile equipment 17. (Step S112) Accordingly, the calling signal succeeding the switching signal is entered into the facsimile equipment 17 by engaging the line interface means 21 with the internal telephone line 19.

After the facsimile equipment 17 installed in the intended guest room is engaged with the internal telephone line 19, the control means 9 in the PBX controls the communication channel switching circuit 4 to establish a communication line connecting the external telephone line 1 of the opponent party with the internal telephone line of the intended guest room.

When the required facsimile communication is completed, the line switching means 15 in the line switching device connects the internal telephone line 19 to the telephone 18.

If the opponent party dials "1" in the step S105, no switching signal is generated and the control means 9 controls the calling signal sending means 6 to send out another calling signal representing telephone conversation (Step S108). Since the line switching means 15 is usually situated to effect the telephone line 18, the telephone 18 rings in response to the calling signal.

The operation of facsimile transmission executed by the guest in the hotel to reach the external party is the same as that of the first embodiment, and therefore, will not be explained again.

Namely, the control means (9) functions as an incoming and outgoing call control means for controlling the external line interface means (2) to engage with the external telephone line (1) in response to an Outgoing call request generated from the internal telephone line (19), for controlling communication channel switching means (4) to establish a communication line connecting the external telephone line (1) to the internal telephone line (19), while for disengaging the external line interface means (2) from the external telephone line (1) in response to a hang-up request generated from the internal telephone line (19) and dissolving the communication line established by the communication channel switching means (4).

Furthermore, the method of collecting billing reports reflecting the result of communication is the same as that of the first embodiment, and therefore will not be explained again.

In summary, the second embodiment of the present invention provides an in-house communication system comprising: external line interface means (2) acting as an interface to an external telephone line (1); internal line interface means (5) acting as an interface to an internal telephone line (19); intended party designating signal detecting means (3) for detecting an intended party designating signal entered from the external telephone line (1) through the external line interface means (2); calling signal sending means (6); internal line switching signal sending means (42) for sending out a switching signal in response to the intended party designating signal; control means (9) for controlling, on the basis on information involved in the intended party designating signal detected by the intended party designating signal detecting means (3), the internal line switching signal sending means (42) to send out the switching signal to the internal telephone line (19) through the internal line interface means (5)while controlling the calling signal sending means (6) to send out a calling signal to the internal telephone line (19) through the internal line interface means (5); and internal line switching means (15) for selectively connecting the internal telephone line (19) to a first terminal (17) or a second terminal (18) in accordance with the switching signal sent from the internal line switching signal sending means (42).

Furthermore, the second embodiment of the present invention provides an in-house communication system comprising: external line interface means (2) acting as an interface engageable with an external telephone line (1); internal line interface means (5) acting as an interface to an internal telephone line (19); incoming call number detecting means (3) for detecting an incoming call number entered from an external telephone line (1) through the external line interface means (2) and for outputting an incoming call number data representing the incoming call number detected; communication channel switching means (4) for establishing a communication line connecting the external telephone line (1) to a desired one of a plurality of internal telephone lines (19—19); calling signal sending means (6); internal line switching signal sending means (42) for sending out a switching signal in response to the incoming call number data; memory means (10) for storing a table memorizing information relating to internal telephone lines (19—19) corresponding to each of the incoming call number data; control means (9) for determining an intended internal line (19) based on the table in the memory means (10) upon receiving the incoming call number data from the incoming call number detecting means (3), for judging whether the incoming call number data is designated for a first terminal (17) or a second terminal (18), and for controlling the internal line switching signal sending means (42) to send out a switching signal identifying the first terminal (17) or the second terminal (18) to the intended internal telephone line (19) while controlling the calling signal sending means (6) to send out a calling signal to the intended internal telephone line (19); internal line switching means (15); and switching signal detecting means (19) for detecting the switching signal sent out from the internal line switching signal sending means (42), and for controlling the internal line switching means (15) to connect the intended internal telephone line (19) to the first terminal (17) when the switching signal identifies the first terminal (17) while controlling the internal line switching means (15) to connect the intended internal telephone line (19) to the second terminal (17) when the switching signal identifies the second terminal (18).

Still further, the second embodiment of the present invention provides a private branch exchange comprising: external line interface means (2) acting as an interface to an external telephone line (1); internal line interface means (5) acting as an interface to an internal telephone line (19); intended party designating signal detecting means (3) for detecting an intended party designating signal entered from the external telephone line (1) through the external line interface means (2); calling signal sending means (6); internal line switching signal sending means (42) for sending out a switching signal in response to the intended party designating signal; incoming call control means (9) for controlling, on the basis on information involved in the intended party designating signal detected by the intended party designating signal detecting means (3), the internal line switching signal sending means (42) to send out the switching signal to the internal telephone line (19) through the internal line interface means (5) while controlling the calling signal sending means (6) to send out a calling signal to the internal telephone line (19) through the internal line interface means (5); incoming and outgoing call control means (9) for controlling the external line interface means (2) to engage with the external telephone line (1) in response to an outgoing call request generated from the internal telephone line (19), for controlling communication channel switching means (4) to establish a communication line connecting the external telephone line (1) to the internal telephone line (19), while for disengaging the external line interface means (2) from the external telephone line (1) in response to a hang-up request generated from the internal telephone line (19) and dissolving the communication line established by the communication channel switching means (4); and memory means (10) for memorizing information relating to communication result which is sent from the internal telephone line (19).

Third Embodiment

Figure 9:
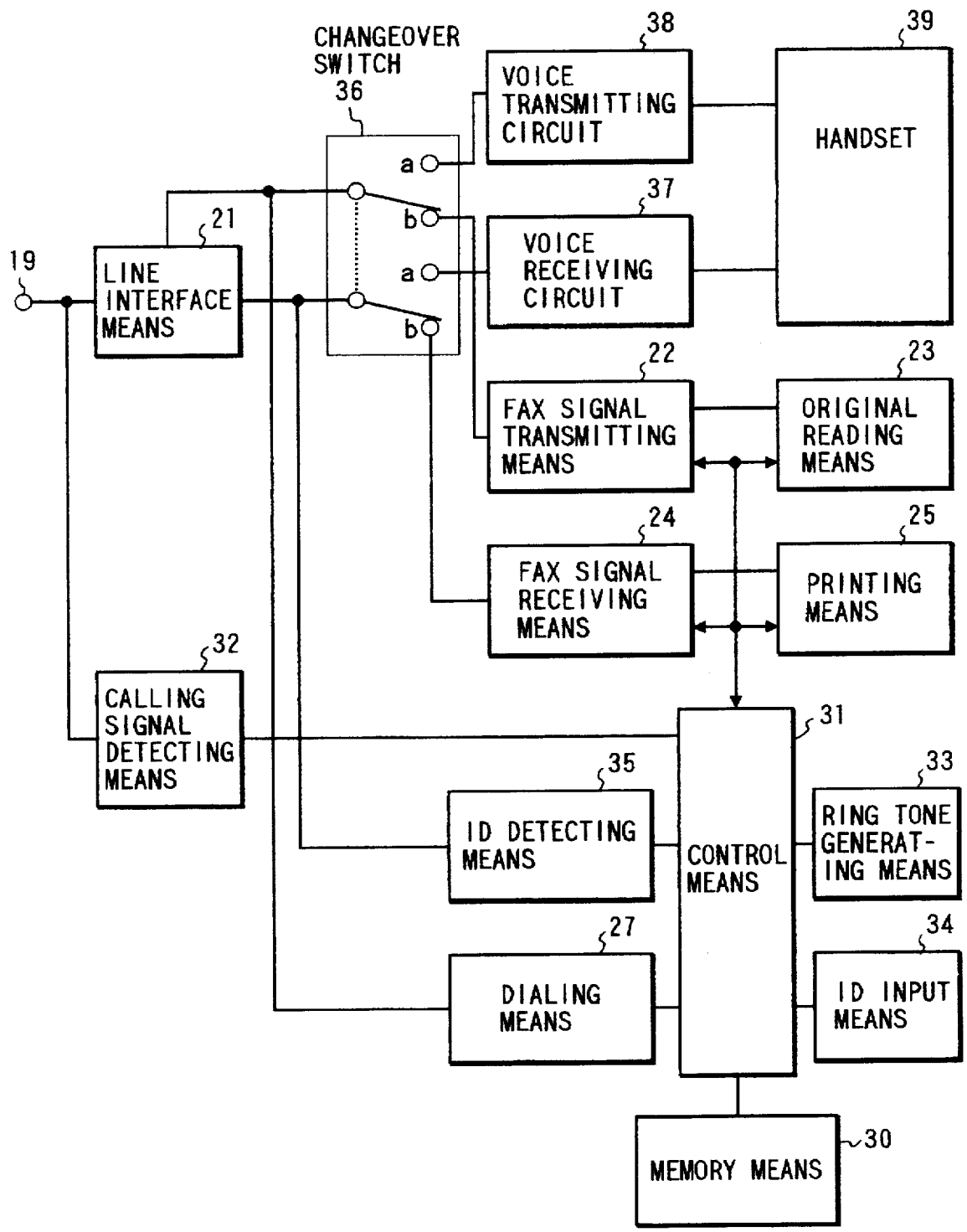
FIG. 9 is a schematic block diagram showing a communication terminal in an in-house communication system in accordance with a third embodiment of the present invention.

The third embodiment of the present invention relates to a communication terminal having both facsimile communication function and telephone conversation function. FIG. 9 is a block diagram showing this communication terminal, which is installed in each guest room and connected through a telephone line to the private branch exchange (PBX) shown in FIG. 1. FIGS. 10A, 10B and 10C are flowcharts showing operation of the in-house communication system in accordance with the third embodiment of the present invention. The same reference numerals as those of the first embodiment are applied to like parts.

In FIG. 9, a reference numeral 33 represents a ring tone generating means, a reference numeral 34 represents an identification code input means, a reference numeral 35 represents an identification code detecting means, a reference numeral 36 represents a changeover switch, a reference numeral 37 represents a voice receiving circuit, a reference numeral 38 represents a voice transmitting circuit, and a reference numeral 39 represents a handset.

Next, operation of facsimile transmission executed by the external party to reach the guest in the hotel will be explained. In this case, each guest room is given an exclusive telephone number according to the dial-in service system. It should be understood that the third embodiment is different from the first embodiment in that no facsimile number is given to each guest room.

First of all, the external party dials the telephone number of the room of this guest. The external exchange station, having received this telephone number, sends a ring signal together with the telephone number dialed to a corresponding subscriber (i.e. hotel). These signals are received by the PBX in the hotel.

Referring to FIG. 10A, a judgement is made in a step S201 as to whether or not the ring signal is detected by the external line interface means 2 in the PBX. The, the incoming call signal detecting means 3 detects an incoming call number in a step S202, and sends the incoming call number data representing the incoming call number to the control means 9.

The table stored in the memory means 10 memorizes internal telephone line ports corresponding to incoming call number data. Accordingly, when the incoming call number is known, it is possible to determine an internal telephone line to be connected referring to the table stored in the memory means 10. Thus, with reference to the table of the memory means 10, controls the calling signal sending means 6 to send out a calling signal to the internal telephone line 19. (Step S203)

When the facsimile equipment 17 receives the calling signal, the calling signal detecting means 32 sends a detection signal to the control means 31 (Step S211). The control means 31 controls the line interface means 21 to engage with the internal telephone line 19. (S212) After the facsimile equipment 17 connects the line, the control means 9 in the PBX controls the communication channel switching circuit 4 to establish a communication line connecting the internal telephone line 19 with the external telephone line carrying the incoming call number. (S204)

The facsimile signal receiving means 24 of the facsimile equipment 17 detects a FAX signal entered from the external telephone line presently engaged. (Step S213) In response to the FAX signal, the control means 31 controls the facsimile signal receiving means 24, the facsimile signal transmitting means 22 and the printing means 25 to execute facsimile communication. (Step S214)

If the FAX signal is not detected in the step S213, the control means 31 changes the changeover switch 36 to switch its movable terminal to a stationary terminal "a", thereby allowing the ring tone generating means 33 to generate ring tone. (Step S215) Thus, the guest can respond to this ring tone and enjoy a telephone conversation with the external party.

As described above, the third embodiment of the present invention can provide both facsimile and telephone service directly available in each guest room without renovating the telephone wiring in the facility or depending on an operator.

Next, an identification code reception will be explained. This embodiment allows each guest of a hotel to set an identification code (abbreviated ID code) when he/she manipulates the identification code input means 34 of the facsimile equipment 17 installed in each guest room. The ID code determined by the guest is memorized in the memory means 30.

First of all, the external party who knows the ID code of the guest dials the telephone number of the room of this guest to send a facsimile letter or document. The external exchange station, having received this telephone number, sends a ring signal together with the telephone number dialed to a corresponding subscriber (i.e. hotel). These signals are received by the PBX in the hotel. After the external line interface means 2 of the PBX receives the incoming call, the same procedure as steps S201 to S204 of FIG. 10A is executed.

When the facsimile equipment 17 receives the calling signal, the calling signal detecting means 32 sends a detection signal to the control means 31 (Step S221). The control means 31 controls the line interface means 21 to engage with the internal telephone line 19. (S222) After the facsimile equipment 17 connects the line, the control means 9 in the PBX controls the communication channel switching circuit 4 to establish a communication line connecting the internal telephone line 19 with the external telephone line carrying the incoming call number. (S204)

Then, the external party enters the ID code of the guest, which is in turn sent to the facsimile equipment 17 of the intended guest room via the external exchange station and the PBX in the hotel.

The identification code detecting means 35 of the facsimile equipment 17 detects this ID code entered from the external party. The control means 31 compares this ID code with the ID code stored in the memory means 30. (Step S223) When the coincidence is found, the control means 31 controls the facsimile signal receiving means 24, the facsimile signal transmitting means 22 and the printing means 25 to execute facsimile communication. (Step S224)

If coincidence is not found in the step S223, the control means 31 changes the changeover switch 36 to switch its movable terminal to the stationary terminal "a", thereby allowing the ring tone generating means 33 to generate ring tone. (Step S225) Thus, the guest can respond to this ring tone and enjoy a telephone conversation with the external party.

As described above, the third embodiment of the present invention can avoid unnecessary facsimile transmission by letting a guest and his/her permitting external parties to use an ID code. When the guest checks out, the ID code is erased. Thus, important or confidential documents are kept in secret.

In short, the third embodiment of the present invention provides a facsimile equipment comprising: line interface means (21) acting as an interface engageable with a telephone line; facsimile signal detecting means (24) for detecting a facsimile signal entered through the line interface means (21); voice communication means (37, 38 and 39) for executing voice communication; facsimile communication means (22, 23, 24 and 25) for executing communication of facsimile signals; calling signal detecting means (32) for detecting a calling signal; ring tone generating means (33) for generating ring tone; switch means (36) for selectively connecting the telephone line to the voice communication means (37, 38 and 39) or the facsimile communication means (22, 23, 24 and 25); and control means (31) for controlling the line interface means (21) to engage with the telephone line in response to the calling signal detected by the calling signal detecting means (32); and for controlling the facsimile communication means (22, 23, 24 and 25) to execute a facsimile receiving operation when the facsimile signal detecting means (24) detects the facsimile signal, while controlling the switch means (36) to change a communication line to the voice communication means (37, 38 and 39) and controlling the ring tone generating means (33) to generate the ring tone when the facsimile signal detecting means (24) does not detect the facsimile signal.

Furthermore, the third embodiment of the present invention provides an in-house communication terminal comprising: line interface means (21) acting as an interface engageable with an internal line (19) in a private branch exchange (PBX) provided in a facility; identification code memory means (30); identification code detecting means (35) for detecting an identification code sent from an opponent party through the private branch exchange (PBX); facsimile communication means (22, 23, 24 and 25); and control means (31) for comparing the identification code detected by the identification code detecting means (35) with an identification code memorized in advance in the identification code memory means (39), and for controlling the facsimile communication means (22, 23, 24 and 25) to execute a facsimile receiving operation when the identification code detected by the identification code detecting means (35) is identical with the identification code memorized in the identification code memory means (30).

Moreover, the third embodiment of the present invention provides an in-house communication terminal comprising: line interface means (21) acting as an interface engageable with a telephone line; identification code detecting means (35) for detecting an identification code sent from an opponent party through a private branch exchange (PBX) in a facility; ring tone generating means (33) for generating ring tone; identification code memory means (30) for memorizing an identification code entered through an input means (34) manipulated by an operator; voice communication means (37, 38 and 39) for executing voice communication; facsimile communication means (22, 23, 24 and 25) for executing communication of facsimile signals; switch means (36) for selectively connecting the telephone line to the voice communication means (37, 38 and 39) or the facsimile communication means (22, 23, 24 and 25); and control means (31) for comparing the identification code entered from the telephone line and detected by the identification code detecting means (35) with an identification code memorized in the identification code memory means (30), and for controlling the facsimile communication means (22, 23, 24 and 25) to execute a facsimile receiving operation when the identification code detected by the identification code detecting means (35) is identical with the identification code memorized in the identification code memory means (30).

As this invention may be embodied in several forms without departing from the spirit of essential characteristics thereof, the present embodiments as described are therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. An in-house communication system comprising:
a private branch exchange and an internal line switching device, wherein said private branch exchange includes:
external line interface means acting as an interface to an external telephone line;
internal line interface means acting as an interface to an internal telephone line;
intended party designating signal detecting means for detecting an intended party designating signal entered from said external telephone line through said external line interface means;
calling signal sending means for producing calling signals of plural patterns in accordance with said intended party designating signal; and
control means for controlling said calling signal sending means to send out a calling signal to said internal telephone line through said internal line interface means on the basis on information involved in said intended party designating signal detected by said intended party designating signal detecting means;
wherein said internal line switching device is connected to an internal telephone line of said private branch exchange for selectively connecting said internal telephone line to a first terminal or a second terminal in accordance with a pattern of said calling signal sent out from said calling signal sending means.

2. The in-house communication system in accordance with claim 1, wherein said first terminal includes a facsimile equipment and said second terminal includes a telephone.

3. An in-house communication system comprising:

a private branch exchange and an internal line switching device connected to an internal telephone line of said private branch exchange, wherein said private branch exchange includes:
- external line interface means acting as an interface engageable with an external telephone line;
- internal line interface means acting as an interface to an internal telephone line;
- incoming call number detecting means for detecting an incoming call number entered from an external telephone line through said external line interface means and for outputting an incoming call number data representing said incoming call number detected;
- communication channel switching means for establishing a communication line connecting said external telephone line to a desired one of a plurality of internal telephone lines;
- calling signal sending means for producing calling signals of plural patterns;
- memory means for storing a table memorizing information relating to internal telephone lines corresponding to each of the incoming call number data; and
- first control means for determining an intended internal line based on said table in said memory means upon receiving the incoming call number data from said incoming call number detecting means, for judging whether said incoming call number data is designated for a first terminal or a second terminal, and for controlling said calling signal sending means to send out a first calling signal to said intended internal telephone line when said incoming call number data is designated for the first terminal while controlling said calling signal sending means to send out a second calling signal to said intended internal telephone line when said incoming call number data is designated for the second terminal;

wherein said internal line switching device includes:
- bell signal detecting means for detecting said calling signal sent out from said calling signal sending means;
- bell signal detecting means for detecting said calling signal sent out from said calling signal sending means;
- line switching means; and
- second control means for judging a calling signal pattern based on an information detected by said bell signal detecting means, and for controlling said line switching means to connect said intended internal telephone line to said first terminal when the first calling signal is generated from said calling signal sending means while controlling said line switching means to connect said intended internal telephone line to said second terminal when the second calling signal is generated from said calling signal sending means.

4. The in-house communication system in accordance with claim 3, wherein said first terminal includes a facsimile equipment and said second terminal includes a telephone.

5. An in-house communication system comprising: a private branch exchange and an internal line switching device connected to an internal telephone line of said private branch exchange, wherein said private branch exchange includes:
- external line interface means acting as an interface to an external telephone line;
- internal line interface means acting as an interface to an internal telephone line;
- intended party designating signal detecting means for detecting an intended party designating signal entered from said external telephone line through said external line interface means;
- calling signal sending means;
- internal line switching signal sending means for sending out a switching signal in response to said intended party designating signal; and
- control means for controlling, on the basis on information involved in said intended party designating signal detected by said intended party designating signal detecting means, said internal line switching signal sending means to send out said switching signal to said internal telephone line through said internal line interface means while controlling said calling signal sending means to send out a calling signal to said internal telephone line through said internal line interface means;

wherein said internal line switching device is connected to an internal telephone line of said private branch exchange for selectively connecting said internal telephone line to a first terminal or a second terminal in accordance with said switching signal sent from said internal line switching signal sending means.

6. The in-house communication system in accordance with claim 5, wherein said-first terminal includes a facsimile equipment and said second terminal includes a telephone.

7. An in-house communication system comprising: a private branch exchange, a line switching circuit and an internal line switching device connected to an internal telephone line of said private branch exchange, wherein said private branch exchange includes:
- external line interface means acting as an interface engageable with an external telephone line;
- internal line interface means acting as an interface to an internal telephone line;
- incoming call number detecting means for detecting an incoming call number entered from an external telephone line through said external line interface means and for outputting an incoming call number data representing said incoming call number detected;
- communication channel switching means for establishing a communication line connecting said external telephone line to a desired one of a plurality of internal telephone lines;
- calling signal sending means;
- internal line switching signal sending means for sending out a switching signal in response to said incoming call number data;
- memory means for storing a table memorizing information related to internal telephone lines corresponding to each of the incoming call number data; and
- control means for determining an intended internal line base on said table in said memory means upon receiving the incoming call number data from said incoming call number detecting means, for judging whether said incoming call number data is designated for a first terminal or a second terminal, and for controlling said internal line switching signal sending means to send out a switching signal identifying said first terminal or said second terminal to said intended internal telephone line while controlling said calling signal sending means to send out a calling signal to said intended internal telephone line;

wherein said internal line switching device includes:
switching signal detecting means for detecting said switching signal sent out from said internal line switching signal sending means, and for controlling said line switching circuit to connect said intended internal telephone line to said first terminal when said switching signal identifies the first terminal while controlling said line switching circuit to connect said intended internal telephone line to said second terminal when said switching signal identifies the second terminal.

8. The in-house communication system in accordance with claim 7, wherein said first terminal includes a facsimile equipment and said second terminal includes a telephone.

9. An in-house communication system comprising a private branch exchange and at least one facsimile equipment, wherein said facsimile equipment includes:
line interface means acting as an interface engageable with a telephone line;
facsimile communication means;
dialing means for entering a telephone number of an opponent party;
first memory means for memorizing information relating to communication result;
first control means for controlling said dialing means to execute a dialing operation when a facsimile transmission mode is selected, for controlling said facsimile communication means to start transmitting image data after receiving a response from said opponent party, and for memorizing result of image data transmission in said first memory means; and
second control means for disconnecting said telephone line after said first control means completes the image data transmission and then connecting said telephone line again to send out the result of image data transmission stored in said first memory means to said private branch exchange; and
said private branch exchange includes a second memory means for memorizing said result of image data transmission.

10. The in-house communication system in accordance with claim 9, wherein said facsimile communication means includes reading means reading an original, and transmitting means transmitting image data obtained from said reading means.

11. The in-house communication system in accordance with claim 9, wherein said first memory means in said facsimile equipment memorizes information relating to communication result of each guest room in which the facsimile equipment is installed, and sends said information relating to communication result of each guest room to said private branch exchange in response to a request signal sent from said private branch exchange.

12. An in-house communication system comprising a private branch exchange, an internal line switching device and a facsimile equipment, wherein said private branch exchange includes:
external line interface means acting as an interface to an external telephone line;
internal line interface means acting as an interface to an internal telephone line;
intended party designating signal detecting means for detecting an intended party designating signal entered from said external telephone line through said external line interface means;
calling signal sending means;
internal line switching signal sending means for sending out a switching signal in response to said intended party designating signal;
incoming call control means for controlling, on the basis on information involved in said intended party designating signal detected by said intended party designating signal detecting means, said internal line switching signal sending means to send out said switching signal to said internal telephone line through said internal line interface means while controlling said calling signal sending means to send out a calling signal to said internal telephone line through said internal line interface means; and
incoming and outgoing call control means for controlling said external line interface means to engage with said external telephone line in response to an outgoing call request generated from the internal telephone line, for controlling communication channel switching means to establish a communication line connecting said external telephone line to said internal telephone line, while for disengaging said external line interface means from said external telephone line in response to a hang-up request generated from said internal telephone line and dissolving said communication line established by said communication channel switching means; and
memory means for memorizing information relating to communication result which is sent from said internal telephone line; and
said internal line switching device is connected to said internal telephone line and is selectively connectable to said facsimile equipment or a telephone; and
said facsimile equipment includes:
facsimile communication means;
dialing means for entering a telephone number of an opponent party;
memory means for memorizing information relating to communication result;
first control means for sending out the outgoing call request to said private branch exchange through said internal line switching device, for controlling said dialing means to execute a dialing operation when a facsimile transmission mode is selected, and controlling said facsimile communication means to start transmitting image data, and then memorizing result of image data transmission in said memory means; and
second control means for disconnecting said internal telephone line after said first control means completes the image data transmission and then connecting said internal telephone line again to send out the result of image data transmission stored in said memory means to said private branch exchange through said internal line switching device.

13. The in-house communication system in accordance with claim 12, wherein said memory means in said facsimile equipment memorizes information relating to communication result of each guest room in which the facsimile equipment is installed, and sends said information relating to communication result of each guest room to said private branch exchange in response to a request signal sent from said private branch exchange.

14. A facsimile equipment comprising:
  line interface means acting as an interface engageable with a telephone line;
  facsimile communication means;
  dialing means for entering a telephone number of an opponent party;
  memory means for memorizing information relating to communication result;
  first control means for controlling said dialing means to execute a dialing operation when a facsimile transmission mode is selected, for controlling said facsimile communication means to start transmitting image data after receiving a response from said opponent party, and for memorizing result of image data transmission in said memory means; and
  second control means for disconnecting said telephone line after said first control means completes the image data transmission and then connecting said telephone line again to send out the result of image data transmission stored in said memory means to a private branch exchange.

15. An in-house communication system comprising a facsimile equipment and a private branch exchange connected with each other, wherein
  said facsimile equipment includes:
    line interface means acting as an interface engageable with a telephone line;
    reading means for reading an original;
    transmitting means for transmitting image data obtained from said reading means;
    dialing means for entering a telephone number of an opponent party;
    calling signal detecting means for detecting a calling signal;
    data detecting means;
    first memory means for memorizing information relating to communication result;
    first control means for controlling said dialing means to execute a dialing operation when a facsimile transmission mode is selected, for controlling said transmitting means to start transmitting image data after receiving a response from said opponent party, and for memorizing result of image data transmission in said first memory means; and
    second control means for engaging said line interface means with said telephone line in response to a calling signal sent out from said private branch exchange and detected by said calling signal detecting means, for sending out the result of image data transmission stored in said first memory means to said private branch exchange in response to a request data sent from said private branch exchange and detected by said data detecting means; and
  said private branch exchange includes:
    second memory means for memorizing said result of image data transmission;
    data transmitting means for sending out said request data to said facsimile equipment; and
    calling signal sending means for sending out the calling signal to be sent to said facsimile equipment.

16. A private branch exchange comprising:
  external line interface means acting as an interface to an external telephone line;
  internal line interface means acting as an interface to an internal telephone line;
  intended party designating signal detecting means for detecting an intended party designating signal entered from said external telephone line through said external line interface means;
  calling signal sending means;
  internal line switching signal sending means for sending out a switching signal in response to said intended party designating signal;
  incoming call control means for controlling, on the basis on information involved in said intended party designating signal detected by said intended party designating signal detecting means, said internal line switching signal sending means to send out said switching signal to said internal telephone line through said internal line interface means while controlling said calling signal sending means to send out a calling signal to said internal telephone line through said internal line interface means;
  incoming and outgoing call control means for controlling said external line interface means to engage with said external telephone line in response to an outgoing call request generated from the internal telephone line, for controlling communication channel switching means to establish a communication line connecting said external telephone line to said internal telephone line, while for disengaging said external line interface means from said external telephone line in response to a hang-up request generated from said internal telephone line and dissolving said communication line established by said communication channel switching means; and
  memory means for memorizing information relating to communication result which is sent from said internal telephone line.

17. A facsimile equipment comprising:
  line interface means acting as an interface engageable with a telephone line;
  facsimile signal detecting means for detecting a facsimile signal entered through said line interface means;
  voice communication means for executing voice communication;
  facsimile communication means for executing communication of facsimile signals;
  calling signal detecting means for detecting a calling signal;
  ring tone generating means for generating ring tone;
  switch means for selectively connecting said telephone line to said voice communication means or said facsimile communication means; and
  control means for controlling said line interface means to engage with said telephone line in response to the calling signal detected by said calling signal detecting means; and for controlling said facsimile communication means to execute a facsimile receiving operation when said facsimile signal detecting means detects the facsimile signal, while controlling said switch means to change a communication line to said voice communication means and controlling said ring tone generating means to generate the ring tone when said facsimile signal detecting means does not detect the facsimile signal.

18. The facsimile equipment in accordance with claim 17, wherein said facsimile communication means includes facsimile signal receiving means, printing means, original reading means and facsimile signal transmitting means, and said voice communication means includes voice receiving means, voice transmitting means and a handset.

19. An in-house communication terminal comprising:

line interface means acting as an interface engageable with an internal line in a private branch exchange provided in a facility;

identification code memory means;

identification code detecting means for detecting an identification code sent from an opponent party through said private branch exchange;

facsimile communication means; and control means for comparing said identification code detected by said identification code detecting means with an identification code memorized in advance in said identification code memory means, and for controlling said facsimile communication means to execute a facsimile receiving operation when said identification code detected by said identification code detecting means is identical with said identification code memorized in said identification code memory means.

20. An in-house communication terminal comprising:

line interface means acting as an interface engageable with a telephone line;

identification code detecting means for detecting an identification code sent from an opponent party through a private branch exchange in a facility;

ring tone generating means for generating ring tone;

identification code memory means for memorizing an identification code entered through an input means manipulated by an operator;

voice communication means for executing voice communication;

facsimile communication means for executing communication of facsimile signals;

switch means for selectively connecting said telephone line to said voice communication means or said facsimile communication means; and control means for comparing said identification code entered from said telephone line and detected by said identification code detecting means with an identification code memorized in said identification code memory means, and for controlling said facsimile communication means to execute a facsimile receiving operation when said identification code detected by said identification code detecting means is identical with said identification code memorized in said identification code memory means.

21. The in-house communication terminal in accordance with claim 20, wherein said facsimile communication means includes facsimile signal receiving means, printing means, original reading means and facsimile signal transmitting means, and said voice communication means includes voice receiving means, voice transmitting means and a handset.

* * * * *